(12) United States Patent
Kawatake et al.

(10) Patent No.: US 8,842,393 B2
(45) Date of Patent: Sep. 23, 2014

(54) CONNECTING STRUCTURE FOR A PLATE MATERIAL AND AN OPPOSITE MEMBER BETWEEN WHICH A RESIN SEAT IS INTERPOSED AND HEAD SUSPENSION WITH THE CONNECTING STRUCTURE

(75) Inventors: Ryuichi Kawatake, Kanagawa (JP);
Hisashi Shiramatsu, Kanagawa (JP);
Takuya Momose, Kanagawa (JP);
Takashi Maruyama, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 13/530,385

(22) Filed: Jun. 22, 2012

(65) Prior Publication Data

US 2013/0010393 A1 Jan. 10, 2013

(30) Foreign Application Priority Data

Jul. 4, 2011 (JP) ................................ 2011-148607

(51) Int. Cl.
*G11B 5/48* (2006.01)
(52) U.S. Cl.
CPC .................................. *G11B 5/4833* (2013.01)
USPC ....................................................... 360/294.3

(58) Field of Classification Search
USPC .......... 360/244.5, 245.4, 245.8, 245.9, 246.1, 360/294.3, 294.4
See application file for complete search history.

(56) References Cited

U.S. PATENT DOCUMENTS

| 5,321,568 | A | * | 6/1994 | Hatam-Tabrizi | 360/245.1 |
| 6,005,750 | A | * | 12/1999 | Willard et al. | 360/244.8 |
| 6,741,426 | B2 | * | 5/2004 | Girard | 360/245.4 |
| 7,542,242 | B2 | * | 6/2009 | Shiraishi et al. | 360/245.9 |

FOREIGN PATENT DOCUMENTS

| JP | 2002-133813 | 5/2002 |
| JP | 2002-184139 | 6/2002 |

\* cited by examiner

*Primary Examiner* — Angel Castro
(74) *Attorney, Agent, or Firm* — Jordan and Hamburg LLP

(57) ABSTRACT

A head suspension with a connecting structure for a plate material comprises a base plate attached to a carriage that rotates the base plate around an axis, a load beam including a rigid part and a resilient part, a base end of the load beam fixed to the base plate at a plurality of first welded points, a flexure including a read/write head and a wiring and fixed to the load beam at a plurality of second welded points, and a resin seat interposed between the load beam and the flexure so that the resin seat prevents the load beam and the flexure from hitting each other due to vibration of at least one of the load beam and the flexure.

16 Claims, 8 Drawing Sheets

Fig.8
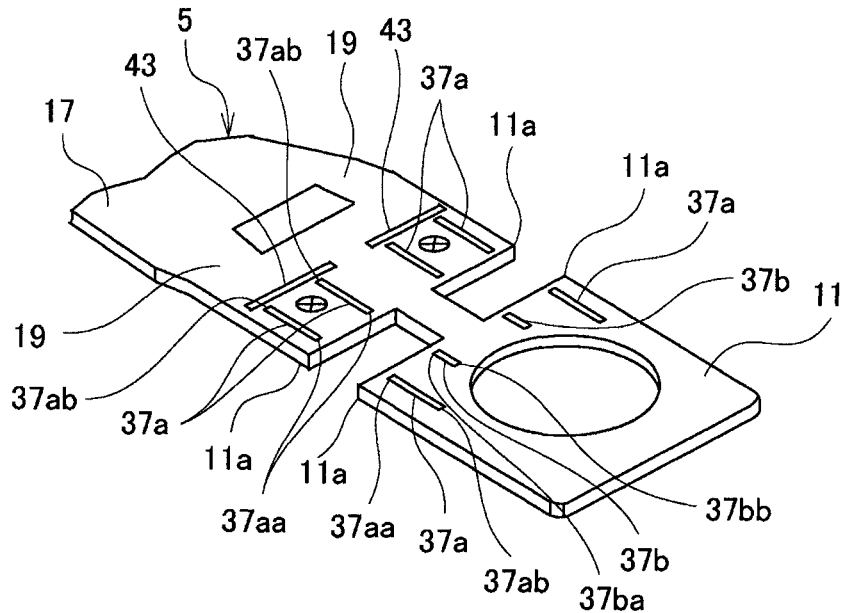
Fig.9A
Fig.9B
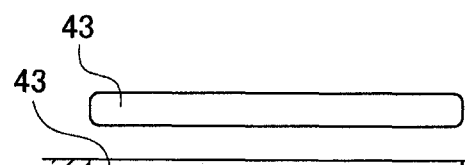
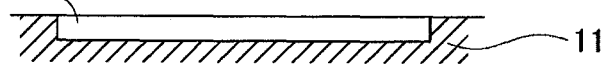
Fig.10A
Fig.10B
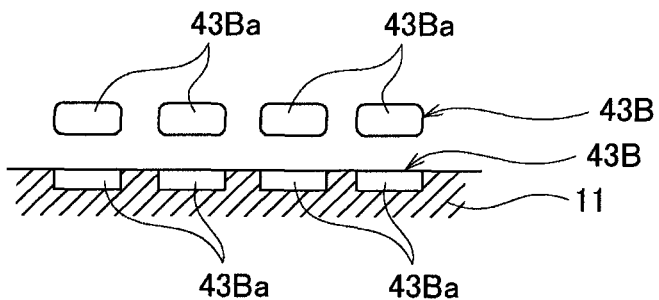
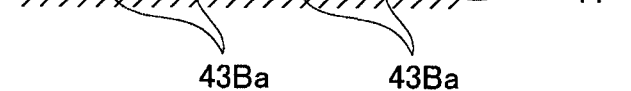
Fig.11A
Fig.11B
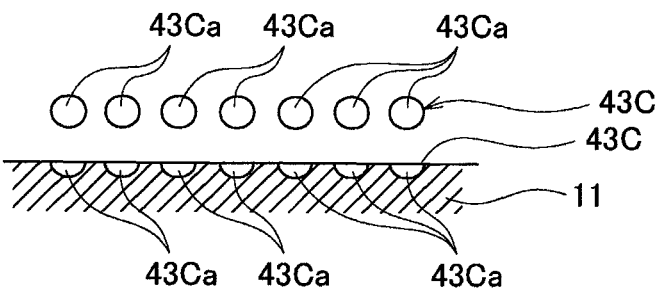

Fig.14
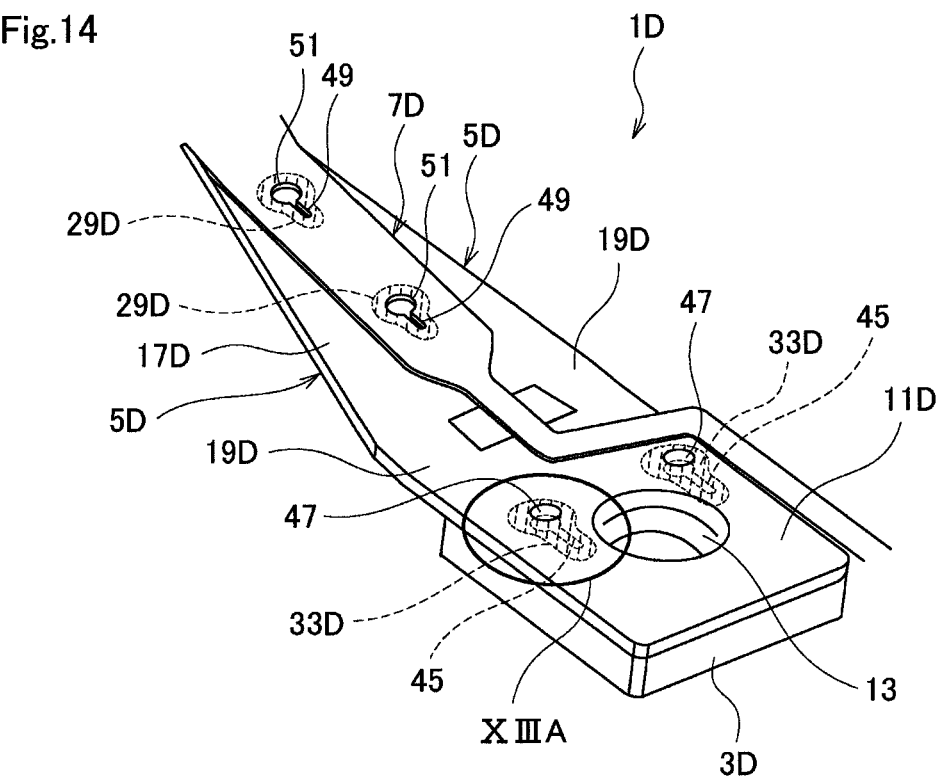
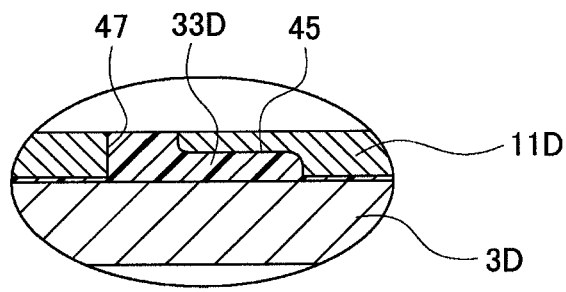
Fig.15A
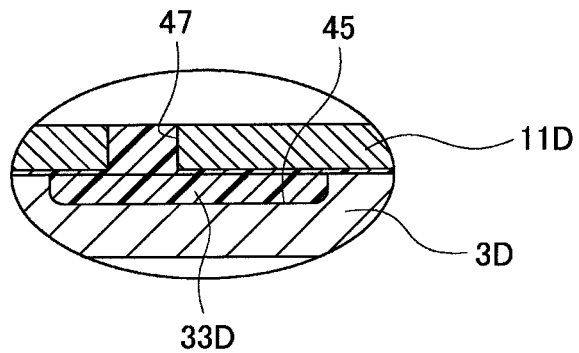
Fig.15B

CONNECTING STRUCTURE FOR A PLATE MATERIAL AND AN OPPOSITE MEMBER BETWEEN WHICH A RESIN SEAT IS INTERPOSED AND HEAD SUSPENSION WITH THE CONNECTING STRUCTURE

BACKGROUND OF THE INVENTION

1. Field of the Invention

The present invention relates to a connecting structure for a plate material and an opposite member and to a head suspension with the connecting structure incorporated in, for example, a hard disk drive.

2. Description of Related Art

A head suspension incorporated in a hard disk drive has a slider that slightly flies or floats with respect to a hard disk to write/read data to and from the hard disk. For recent hard disk drives, high recording density is required and a flying height of a slider lowers yearly according to the high recording density. Currently, a flying height lowers down to several nanometers. As a flying height lowers, needs for high cleanliness of a head suspension incorporated in a hard disk drive are increasing.

For this, there are techniques for preventing a head suspension as a product from producing particles as disclosed in Japanese Unexamined Patent Application Publications No. 2002-133813 and No. 2002-184139.

In JP 2002-133813 A, a head suspension includes a load beam on which a flexure is laid. The flexure longitudinally extends along the head suspension and has a bend that laterally protrudes from the load beam in the middle of the head suspension. To prevent the bent and the load beam from wearing out each other, the load beam is provided with a curved edge or a chamfered edge.

In JP 2002-184139 A, a head suspension includes piezoelectric elements made of, for example, PZT (lead zirconate titanate). Each piezoelectric element has peripheral side faces coated with resin to prevent particles from dropping off the side faces.

These techniques promise a certain level of effect for preventing a head suspension as a product from producing particles.

On the other hand, a product of each head suspension is cleaned by ultrasonic cleaning in a bath filled with pure water to effectively remove particles as contamination stuck to the product before shipment thereof. In the ultrasonic cleaning, there is a new problem.

As illustrated in FIG. 17, a recent head suspension 101 includes a flexure 103 and a load beam 105 laid on the flexure 103. The flexure 103 and load beam are very thin plates made of metal foils with respective thicknesses of, for example, 18 um and 30 um and are fixed to each other by laser welding. The thin plates of the flexure 103 and load beam 105 cause slight gaps 111, 113 and 115 due to deformation of the thin plates of the metal foils at portions on the load beam 5, around a resilient part and a piezoelectric element between welded points 107 and 109.

In the gaps 111, 113 and 115, the thin plates hit each other by ultrasonic vibration at the time of the cleaning. This slightly breaks a metal surface of each thin plate to generate fine particles.

Although the particles are almost removed through the cleaning, some particles may be retained in the gaps 111, 113 and 115 until the cleaned product is incorporated in a hard disk drive. In this case, the product involves a risk of dropping the particles off the gaps 111, 113 and 115 in the hard disk drive.

Further, the product with the gaps reduces the accuracy of evaluation of cleanliness with use of a liquid particle counter (LPC). Namely, the product produces particles by ultrasonic vibration at the time of extraction of particles as contamination to be originally measured. The produced particles are added to the particles to be originally measured, so that the evaluation of the cleanliness becomes inaccurate.

SUMMARY OF THE INVENTION

An object of the present invention is to provide a connecting structure for a plate material and an opposite member between which a resin seat is interposed and a head suspension with the connecting structure capable of preventing the plate material and opposite member from surface breaking by ultrasonic vibration or the like to suppress defect due to particles dropping off from the plate material or opposite member.

In order to accomplish the object, a first aspect of the present invention provides a connecting structure for a plate material and an opposite member between which a resin seat is interposed. The connecting structure includes the plate material and the opposite member having a surface on which the plate material is fixed at plural welded points. The connecting structure also includes a resin seat interposed between the plate material and the opposite member so that the resin seat prevents the plate material and the opposite member from hitting each other due to vibration of at least one of the plate material and the opposite member.

A second aspect of the present invention provides a head suspension with a connecting structure. The head suspension includes a base plate, a load beam and a flexure. The base plate is attached to a carriage that rotates the base plate around an axis. The load beam includes a rigid part and a resilient part. A base end of the load beam is fixed to the base plate at first welded points. The flexure including a read/write head and a wiring is fixed to the load beam at a plurality of second welded points. The head suspension also includes a resin seat interposed between the load beam and the flexure so that the resin seat prevents the load beam and the flexure from hitting each other due to vibration of at least one of the load beam and the flexure.

A third aspect of the present invention provides an another head suspension with a connecting structure. The head suspension includes a base plate, a load beam and a flexure. The base plate is attached to a carriage that rotates the base plate around an axis. The load beam has a rigid part and a resilient part to which a rigid part is connected to be disposed distal to the base plate. The resilient part is integrally connected to an auxiliary plate to be disposed proximal to the base plate. The auxiliary plate is fixed to the base plate at a plurality of welded points formed by spot welding. The flexure including a read/write head and a wiring is attached to the load beam. The head suspension also includes a resin seat interposed between the base plate and the auxiliary plate so that the resin seat prevents the base plate and the auxiliary plate from hitting each other due to vibration of at least one of the base plate and the auxiliary plate.

A fourth aspect of the present invention provides an another head suspension with a connecting structure. The head suspension includes a base plate, a load beam, a flexure and a piezoelectric element. The base plate is attached to a carriage that rotates the base plate around an axis. The load beam has a rigid part and a resilient part to which a rigid part is connected to be disposed distal to the base plate. The resilient part is integrally connected to an auxiliary plate to be disposed proximal to the base plate. The auxiliary plate is fixed to the base plate at a plurality of welded points. The flexure including a read/write head and a wiring is fixed to the load beam. The base plate and the auxiliary plate have an opening formed therethrough. The piezoelectric element is attached to the opening through a solidified adhesive to be applied as a liquid adhesive and is deformable in response to voltage applied thereto. The piezoelectric element moves the head through the load beam relative to the base plate according to deformation thereof in a sway direction. The auxiliary plate includes a support edge portion and a recessed portion or groove. The support edge portion protrudes into the opening to support the piezoelectric element. The recessed portion or groove includes an end disposed on the support edge portion. The head suspension also includes a resin seat formed by leading the liquid adhesive into the recessed portion or groove from the end and interposed between the base plate and the auxiliary plate so that the resin seat prevents the base plate and the auxiliary plate from hitting each other due to vibration of at least one of the base plate and the auxiliary plate.

According to the first aspect of the present invention, the resin seat prevents the plate material and the opposite member from hitting each other due to vibration of at least one of the plate material and the opposite member. Therefore, the first aspect prevents the plate material and opposite member from surface breaking to suppress defect due to particles dropping off from the plate material or opposite member.

According to the second aspect of the present invention, the resin seat prevents the load beam and the flexure from hitting each other due to vibration of at least one of the load beam and the flexure. Therefore, the second aspect prevents the load beam and the flexure from surface breaking to suppress defect due to particles dropping off from the load beam or flexure.

According to the third aspect of the present invention, the resin seat prevents the base plate and the auxiliary plate from hitting each other due to vibration of at least one of the base plate and the auxiliary plate. Therefore, the third aspect prevents the base plate and the auxiliary plate from surface breaking to suppress defect due to particles dropping off from the base plate or the auxiliary plate.

According to the fourth aspect of the present invention, the resin seat prevents the base plate and the auxiliary plate in the vicinity of the piezoelectric element from surface breaking to suppress defect due to particles dropping off from the base plate or the auxiliary plate.

BRIEF DESCRIPTION OF THE DRAWINGS

FIG. 8 is a perspective view illustrating a modification of an auxiliary plate having liquid stoppers as well as linear grooves;

FIG. 9A is a plane view illustrating the liquid stopper of FIG. 8;

FIG. 9B is a sectional view of FIG. 9A;

FIG. 10A is plane view illustrating a modification of a liquid stopper;

FIG. 10B is a sectional view of FIG. 10A;

FIG. 11A is plane view illustrating a modification of a liquid stopper;

FIG. 11B is a sectional view of FIG. 11A;

FIG. 14 is a schematic perspective view partly illustrating a head suspension according to a second embodiment;

FIG. 15A is a sectional view illustrating a part XVA in FIG. 14;

FIG. 15B is a sectional view illustrating a modification of a part XVA in FIG. 14;

DETAILED DESCRIPTION OF EMBODIMENTS

Embodiments according to the present invention will be explained. Each embodiment has resin seats disposed between a plate material and an opposite member such as a load beam and a flexure so that the resin seats prevent the plate material and the opposite member from hitting each other due to vibration of at least one of the plate material and the opposite member.

A first embodiment of the present invention will be explained in detail with reference to drawings.

Figure 1:
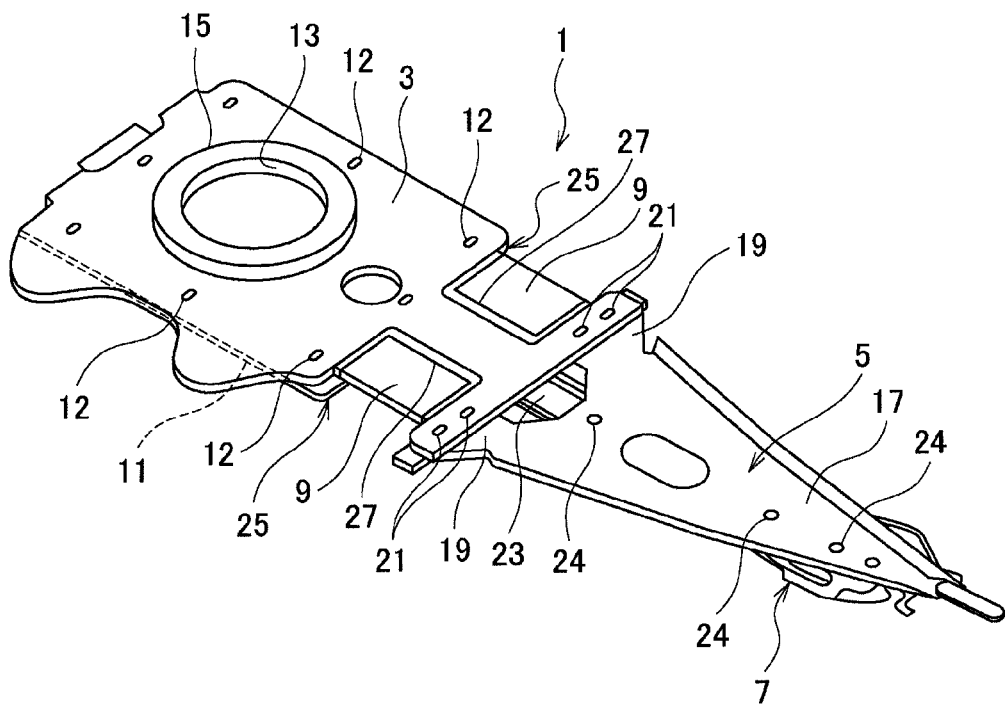
FIG. 1 is a perspective view illustrating a head suspension according to a first embodiment of the present invention.

FIG. 1 is a perspective view illustrating a head suspension according to the first embodiment.

As illustrated in FIG. 1, the head suspension 1 to which a connecting structure is applied has a base plate 3, a load beam 5 and a flexure 7 as plate materials. Additionally, the head suspension 1 has piezoelectric elements 9.

The base plate 3 constitutes a base of the head suspension 1 together with an auxiliary plate 11. The base plate 3 and the auxiliary plate 11 are made of, for example, stainless steel and fixed together at a plurality of third welded points or spots 12 that are formed by spot welding. First and second welded spots will be explained later.

At the base of the head suspension 1, a through hole 13 is formed through both the base plate 3 and the auxiliary plate 11. Surrounding the through hole 13 of the base plate 3 is a boss portion 15 integrally formed on the base plate 3. The boss portion 15 is fitted to an attachment hole of a carriage (not illustrated) by ball caulking. The carriage is supported with a voice coil motor (not illustrated). Therefore, the base plate 3 is attached to the carriage that rotates the base plate 3 around an axis.

The load beam 5 includes a rigid part 17 and a resilient part 19 and is integrally provided with the auxiliary plate 11. The resilient part 19 has a base end proximal to the base plate 3 and the base end of the resilient part 19 is fixed to a front end of the base plate 3 at a plurality of first welded points or spots 21 formed by laser-spot welding. In this way, the load beam 5 including the rigid part 17 and the resilient part 19 and a base end of the load beam 5 is fixed to the base plate 3 at first welded spots 21.

The flexure 7 has a stainless thin plate 23 that is the plate material, a read/write head and a wiring formed on the thin plate 23. The flexure 7 and load beam 5 are fixed together at a plurality of second welded points or spots 24 formed by laser-spot welding.

The head includes a slider that is supported with a tongue of the flexure 7.

The base plate 3 and the auxiliary plate 11 has openings 25 at an area proximal to the base end of the load beam 5. Each opening 25 receives a piezoelectric element 9 made of, for example, PZT (lead zirconate titanate).

To each opening 25, the piezoelectric element 9 is fitted or attached through a non-conductive adhesive 27. The piezoelectric element 9 deforms in response to voltage applied thereto and moves the head through the load beam 5 relative to the base plate 3 in a sway direction (lateral direction).

Figure 2:
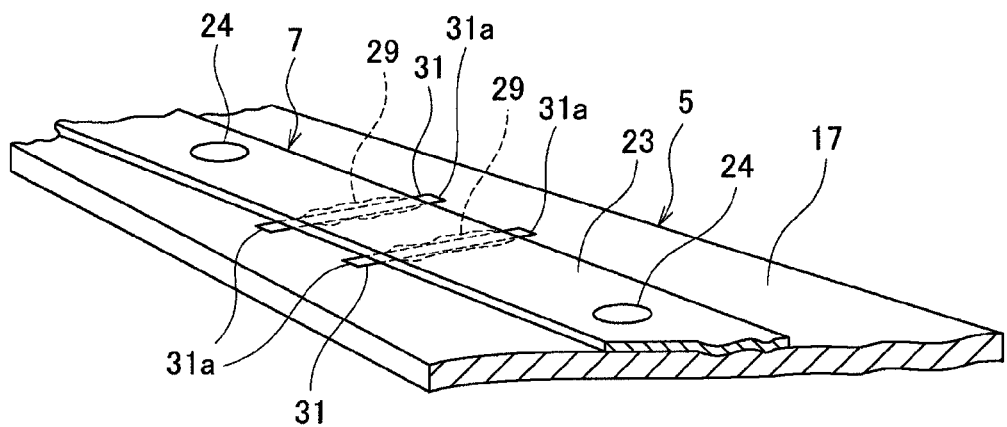
FIG. 2 is a perspective view illustrating resin seats relative to a load beam and a flexure of the head suspension of FIG. 1.
Figure 3A:
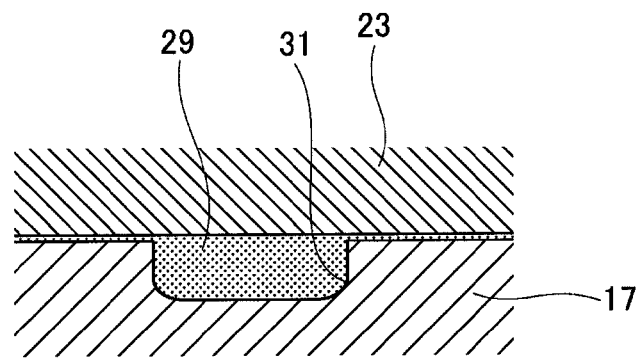
FIG. 3A is a sectional view illustrating the resin seat between the load beam and the flexure of FIG. 2.
Figure 3B:
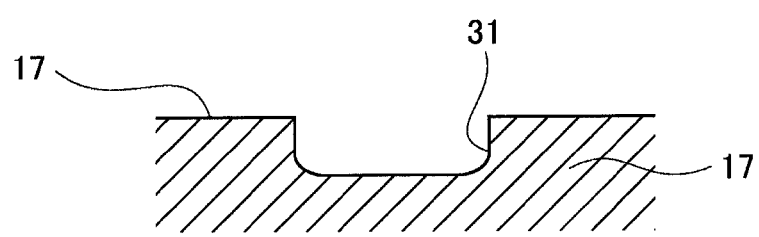
FIG. 3B is a sectional view illustrating a groove formed on the load beam of FIG. 3A.

FIG. 2 is a perspective view illustrating resin seats relative to a load beam and a flexure, FIG. 3A is a sectional view illustrating the resin seat between the load beam and the flexure, and FIG. 3B is a sectional view illustrating a groove formed on the load beam.

As illustrated in FIGS. 2 to 3B, the load beam 5 serves as a plate material or opposite member and the flexure 7 serves as a plate material. Between the load beam 5 and the flexure 7 in an opposing direction, a pair of resin seats 29 are disposed in the middle region between the second welded spots 24 in a planar direction. The resin seats 29 prevent the load beam 5 and the flexure 7 from hitting each other due to vibration of at least one of the load beam 5 and the flexure 7 when, for example, conducting ultrasonic cleaning to the head suspension 1. According to the embodiment, each resin seat 29 has damping characteristics to the vibration of the load beam 5 and/or the flexure 7. The resin seat 29 may have no damping characteristics.

The resin seats 29 between the load beam 5 and the flexure 7 can be positioned in one or both of a first area between the rigid part 17 of the load beam 5 and the flexure 7 and a second area between a portion of the load beam 5 in the vicinity of the resilient part 19 and the flexure 7.

The resin seats 29 in the first area are substantially the same as those in the second area. Therefore, the resin seats 29 in the first area between the rigid part 17 and the flexure 7 will be explained in detail.

As illustrated in FIG. 2, the rigid part 17 of the load beam 5 has a recessed portion or groove 31 corresponding to each resin seat 29 and each resin seat 29 is formed to the corresponding groove 31. The groove 31 is formed on at least one of the rigid part 17 and the flexure 7. The groove may be formed on both the rigid part 17 and the flexure 7 or on the flexure 7 only. In the case of the grooves formed on both the rigid part 17 and the flexure 7, the grooves may be aligned in a straight line along the opposing direction or be shifted in the planar direction.

In FIG. 2, the groove 31 extends in the lateral direction of the head suspension 1 and is longer than a width of the flexure 7 so that each end 31a protrudes from the flexure 7 in the lateral direction. The end 31a exposes on the outside of a facing area through which the rigid part 17 and flexure 7 face each other. Therefore, the end 31a serves as a communicating portion through which the groove 31 communicates with the outside of the facing area. In the case of the groove formed on the flexure 7, the groove may extend to each lateral edge of the flexure 7 to have an opening on each side face defining the edge of the flexure 7 so that the opening serves as the communicating portion.

As illustrated in FIGS. 3A and 3B, the groove 31 has a substantial rectangular sectional shape formed by, for example, partial etching.

In the formation of the resin seat 29, liquid non-conductive adhesive as liquid resin is led into the groove 31 from the end 31a after completed the assembly of the head suspension 1. The led adhesive spreads into the groove 31 and flows out of the groove 31 with capillary phenomenon between the rigid part 17 and the flexure 7, so that the adhesive fills the groove 31 and a gap defined between the rigid part 17 and the flexure 7 in the surrounding area of the groove 31. The adhesive is solidified to form the resin seat 29 between the rigid part 17 and the flexure 7.

The resin seat 29 may be made of any material other than resin as long as it prevents the rigid part 17 and the flexure 7 from hitting each other.

Figure 4B:
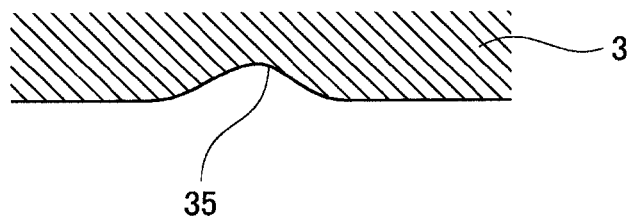
FIG. 4B is a sectional view illustrating a groove formed on the base plate of FIG. 4A.
Figure 4A:
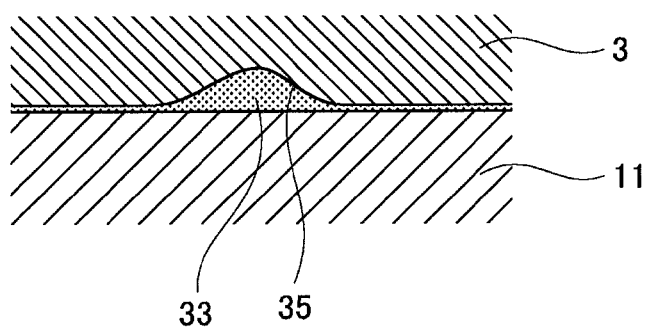
FIG. 4A is a sectional view illustrating a resin seat between a base plate and an auxiliary plate of the head suspension of FIG. 1.

FIG. 4A is a sectional view illustrating a resin seat between the base plate and the auxiliary plate and FIG. 4B is a sectional view illustrating a groove formed on the base plate.

As illustrated in FIGS. 4A and 4B, the base plate 3 serves an opposite member and the auxiliary plate 11 serves as a plate material. Between the base plate 3 and the auxiliary plate 11 in an opposing direction, a resin seat 33 is disposed in the middle region or the like between the third welded spots 12 (FIG. 1) in a planar direction. The resin seat 33 is formed to a recessed portion or groove 35 of the base plate 3. The groove 35 is formed on at least one of the base plate 3 and the auxiliary plate 11. The groove may be formed on both the base plate 3 and the auxiliary plate 11 or on the auxiliary plate 11 only. In the case of the grooves formed on both the base plate 3 and the auxiliary plate 11, the grooves may be aligned in a straight line along the opposing direction or be shifted in the planar direction.

The groove 35 extends out of a width of the auxiliary plate 11 to reach a portion of the base plate 3 that protrudes from the auxiliary plate 11 in the planar direction (FIG. 1). With this structure, an end of the groove 35 exposes on the outside of a facing area through which the base plate 3 and the auxiliary plate 11 face each other. Therefore, the end of the groove 35 serves as a communicating portion through which the groove 35 communicates with the outside of the facing area. In the case of the groove formed on the auxiliary plate 11, the groove may extend to an edge of the auxiliary plate 11 to have an opening on a side face defining the edge of the auxiliary plate 11 so that the opening serves as the communicating portion.

According to the embodiment, the groove 35 in FIGS. 4A and 4B has a substantial angle sectional shape formed on the base plate 3 by, for example, coining.

In the formation of the resin seat 33, liquid non-conductive adhesive as liquid resin is led into the groove 35 from the end after completed the assembly of the head suspension 1. The led adhesive spreads into the groove 35 and flows out of the groove 35 with capillary phenomenon between the base plate 3 and the auxiliary plate 11, so that the adhesive fills the groove 35 and a gap defined between the base plate 3 and the auxiliary plate 11 in the surrounding area of the groove 35. The adhesive is solidified to form the resin seat 33 between the base plate 3 and the auxiliary plate 11. According to the embodiment, the resin seat 33 has damping characteristics to the vibration of the base plate 3 and the auxiliary plate 11. The resin seat 33 may have no damping characteristics.

The resin seat 33 may be made of any material other than resin as long as it prevents the base plate 3 and the auxiliary plate 11 from hitting each other.

Figure 5A:
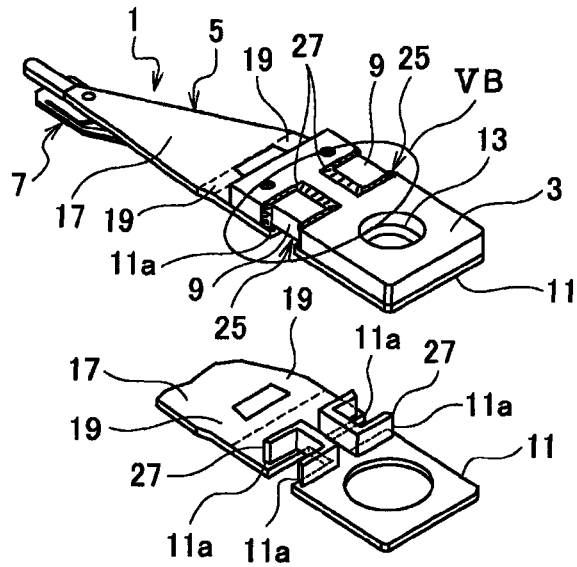
FIG. 5A is a schematic perspective view illustrating the head suspension of FIG. 1.
Figure 5B:
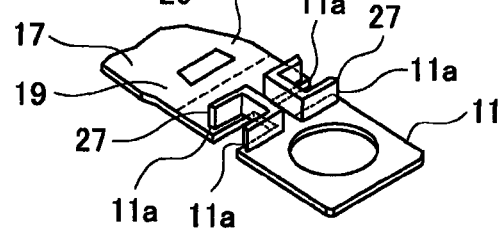
FIG. 5B is a schematic perspective view illustrating adhesive in a region VB of FIG. 5A as well as the auxiliary plate.
Figure 6A:
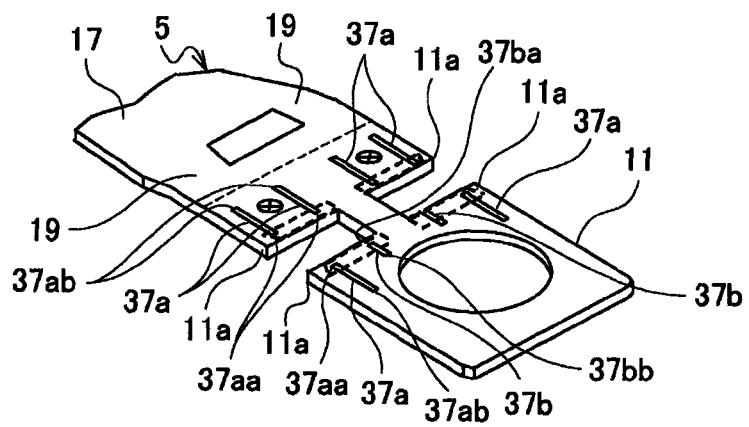
FIG. 6A is a perspective view illustrating the auxiliary plate with linear grooves along a longitudinal direction of the head suspension of FIG. 5A.

FIG. 5A is a schematic perspective view illustrating the head suspension, FIG. 5B is a schematic perspective view illustrating adhesive in a region VB of FIG. 5A as well as the auxiliary plate, and FIG. 6A is a perspective view illustrating the auxiliary plate with linear grooves along the longitudinal direction of the head suspension.

As illustrated in FIGS. 5A to 6A, the auxiliary plate 11 has support edge portions 11a protruding into the openings 25 to support the piezoelectric elements 9, respectively. Each piezoelectric element 9 is put on the support edge portion 11a and is attached to the opening 25 through the adhesive 27 that is filled into a gap between the opening 25 and the piezoelectric element 9.

The auxiliary plate 11 has long grooves 37a and shot grooves 37b. The grooves 37a and 37b are parallel and linearly extend along the longitudinal direction of the load beam 5 or the head suspension 1. The grooves 37a and 37b have first ends 37aa and 37ba disposed on the support edge portions 11a and opened to the openings 25, respectively. The first ends 37aa and 37ba stop short of end edges of the support edge portion portions 11a, i.e., do not extend to the end edges. Second ends 37ab and 37bb of the grooves 37a and 37b extends out of the support edge portion portions 11a.

Each of the first end 37aa and 37b of the grooves 37a and 37b on the support edge portions 11a serves as a communicating portion through which the corresponding groove communicates with the outside of a facing area. Through the facing area, the base plate 3 and the auxiliary plate 11 face each other.

To the grooves 37a and 37b, resin seats 39 are formed. In the formation of the resin seats 39 around each piezoelectric element 9, liquid non-conductive adhesive 27 for attaching piezoelectric element 9 is led into the grooves 37a and 37b from the first ends 37aa and 37ba on the support edge portion 11a. The led adhesives 27 are solidified to form the resin seats 39 between the base plate 3 and the auxiliary plate 11. The resin seats 39 have damping characteristics to the vibration of the base plate 3 and the auxiliary plate 11. The resin seats 39 may have no damping characteristics.

Figure 6B:
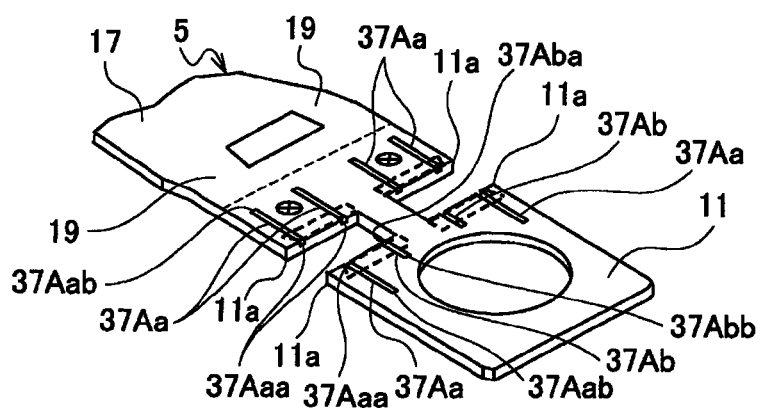
FIG. 6B is a perspective view illustrating a modification of an auxiliary plate with linear grooves.

FIG. 6B is a perspective view illustrating a modification of an auxiliary plate with linear grooves.

Grooves 37Aa and 37Ab in FIG. 6B has first ends 37aa and 37ba on support edge portions 11a. The first ends 37aa and 37ba reach end edges of the support edge portions 11a to have openings on side faces defining the end edges, respectively. Each opening serves as the communicating portion.

Figure 7A:
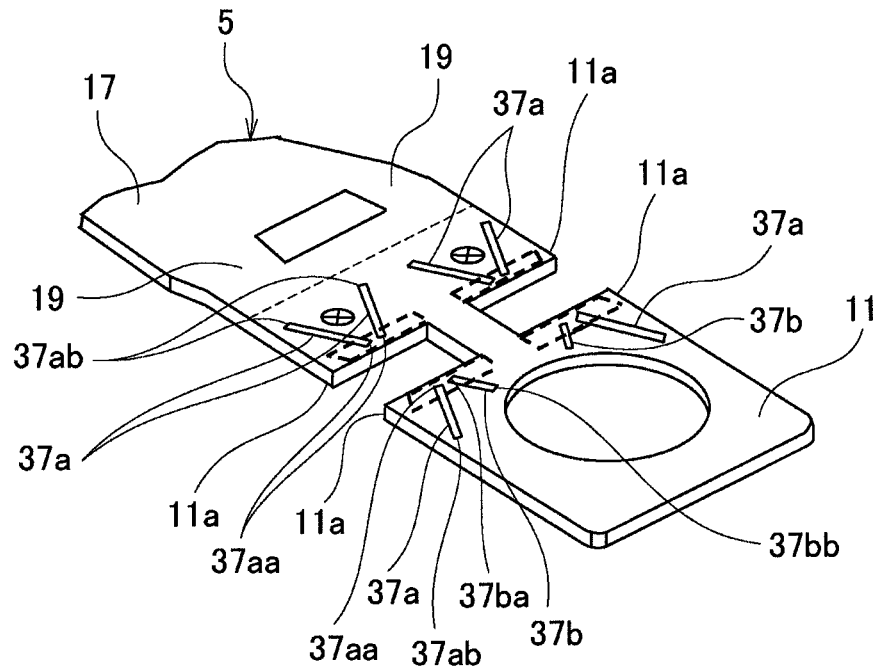
FIG. 7A is a perspective view illustrating a modification of an auxiliary plate with inclined grooves.
Figure 7B:
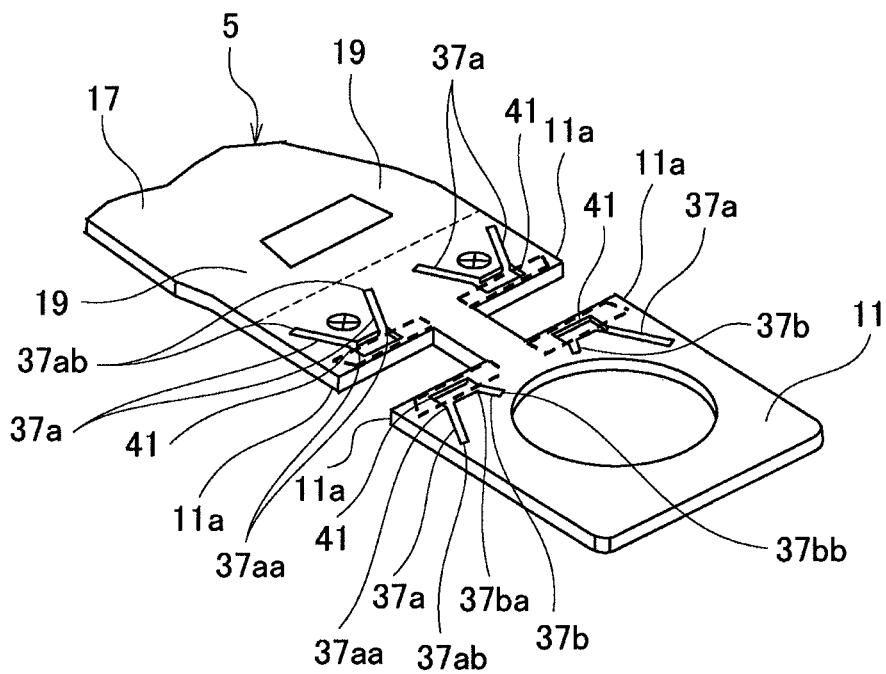
FIG. 7B is a perspective view illustrating a modification of an auxiliary plate with inclined grooves.

FIG. 7A is a perspective view illustrating a modification of an auxiliary plate with inclined grooves and FIG. 7B is a perspective view illustrating an another modification of an auxiliary plate with inclined grooves. Each of the modifications in FIGS. 7A and 7B has a basic structure corresponding to the first embodiment of FIG. 6A and the same or corresponding parts are represented with the same reference marks.

According to the modification in FIG. 7A, grooves 37a and 37b are inclined relative to a longitudinal direction of a head suspension 1. The grooves 37a and 37b in each pair gradually distance away from each other toward second ends 37ab and 37bb that are distal to the support edge portion 11a in the longitudinal direction.

According to the modification in FIG. 7B, grooves 37a and 37b are inclined relative to a longitudinal direction of a head suspension 1, so that the grooves 37a and 37b in each pair gradually distance away from each other toward second ends 37ab and 37bb like the modification of FIG. 7A. The modification in FIG. 7B further includes a recessed portion 41 formed to each pair of grooves 37a and 37b on a support edge portion 11a. The recessed portion 41 communicates with first ends 37aa and 37ba of the grooves 37a and 37b. Namely, the first ends 37aa and 37ba are opened to the recessed portion 41 in a planar direction.

This modification sufficiently spreads liquid adhesive 27 into the grooves 37a and 37b from the recessed portion 41.

FIG. 8 is a perspective view illustrating a modification of an auxiliary plate having liquid stoppers as well as grooves, FIG. 9A is a plane view illustrating the liquid stopper of FIG. 8, FIG. 9B is a sectional view of FIG. 9A, FIG. 10A is plane view illustrating a modification of a liquid stopper, FIG. 10B is a sectional view of FIG. 10A, FIG. 11A is plane view illustrating an another modification of the liquid stopper of FIG. 9A and FIG. 11B is a sectional view of FIG. 11A.

The modification illustrated in FIG. 8 has a basic structure corresponding to the first embodiment of FIG. 6A and the same or corresponding parts are represented with the same reference marks. The modification has liquid stoppers 43 formed to two pairs of grooves 37a and 37b. Each liquid stopper 43 is positioned at a portion opposite to a support edge portion 11a with respect to the grooves 37a and 37b. The liquid stopper 43 is a trap to receive liquid adhesive 27 and stop spreading the liquid adhesive 27 out of the liquid stopper 43.

As illustrated in FIGS. 9A and 9B, the liquid stopper 43 is a long groove extending in a lateral direction of the head suspension 1 and is orthogonal to the grooves 37a and 37b. Both ends of the liquid stopper 43 laterally outwardly protrude from the grooves 37a and 37b, respectively.

The modification illustrated in FIGS. 10A and 10B has a liquid stopper 43B including plural short grooves or recessed portions 43Ba instead of the liquid stopper 43 of FIGS. 9A and 9B. Each recessed portion 43Ba has a rectangular planar shape and a rectangular sectional shape. The recessed portions 43Ba are aligned in a lateral direction of a head suspension 1 to form the liquid stopper 43B. A position and a whole length of the liquid stopper 43B are the same as those of the liquid stopper 43 of FIGS. 9A and 9B.

The modification illustrated in FIGS. 11A and 11B has a liquid stopper 43C including plural circular grooves or recessed portions 43Ca instead of the liquid stopper 43B of FIGS. 10A and 10B. Namely, each recessed portion 43Ba has a circular planar shape and a semi-circular sectional shape. The recessed portions 43Ca are aligned in a lateral direction of a head suspension 1 to form the liquid stopper 43C. A position and a whole length of the liquid stopper 43C are the same as those of the liquid stopper 43 of FIGS. 9A and 9B.

With the modifications, the liquid stopper 43, 43B or 43C receives and stops liquid adhesive flowing out of the grooves 37a and 37b. Therefore, the liquid stopper stops further flowing the liquid adhesive out to prevent the liquid adhesive from affecting a resilient part 19 of a load beam 5 and deteriorating dynamic characteristics of the head suspension 1.

The liquid resin received by the liquid stopper 43, 43B or 43C is solidified to constitute a resin seat between a base plate 3 and an auxiliary plate 11.

According to the above-identified first embodiment, the head suspension 1 includes the base plate 3, the load beam 5 and the flexure 7. The base plate 3 is attached to the carriage that rotates the base plate 3 around an axis. The load beam 5 includes the rigid part 17 and the resilient part 19. The base end of the load beam 5 is fixed to the base plate 3 at a plurality of the first welded spots 21. The flexure 7 including the read/write head and the wiring is fixed to the load beam 5 at a plurality of the second welded spots 24. The head suspension 1 also includes the resin seats 29 interposed between the rigid part 17 of the load beam 5 and the flexure 7 so that the resin seats 29 prevent the load beam 5 and the flexure 7 from hitting each other due to vibration of at least one of the load beam 5 and the flexure 7.

Since the resin seats 29 prevent the rigid part 17 and the flexure 7 from hitting each other due to vibration such as ultrasonic vibration of at least one of the rigid part 17 and the flexure 7, it prevents the rigid part 17 and the flexure 7 from surface breaking to suppress defect due to particles dropping off from the rigid part 17 and the flexure 7.

By conducting ultrasonic cleaning to the head suspension 1, fine particles stuck on a surface of the head suspension 1 are removed while the rigid part 17 and the flexure 7 are prevented from surface breaking so as not to produce particles and retain particles therebetween.

Accordingly, no particle to be drop off remains on the head suspension 1 incorporated in a hard disk drive, so that the head suspension 1 eliminates a risk of dropping particles off a gap between the rigid part 17 and the flexure 7 in the hard disk drive.

Further, the head suspension 1 improves accuracy of evaluation of cleanliness with use of a liquid particle counter (LPC). Namely, the head suspension 1 produces no particles by ultrasonic vibration at the time of extraction of particles to be originally measured due to the resin seats 29. This stabilizes a measurement result of the liquid particle counter.

According to the first embodiment, the head suspension 1 further includes the recessed portions or grooves 31 formed on the rigid part 17 between the rigid part 17 and the flexure 7 and the resin seats 29 are formed to the grooves 31, respectively.

Therefore, each resin seat 29 is easily formed by spreading liquid resin such as liquid non-conductive adhesive into the groove 31, and it is easily positioned and interposed between the rigid part 17 and the flexure 7.

The groove 31 has at least an end 31*a* protruding from the flexure 7, so that the end 31*a* exposes on the outside of the facing area between the rigid part 17 and flexure 7. The end 31*a* serves as a communicating portion through which the groove 31 communicates with the outside of the facing area.

Therefore, in the formation of the resin seat 29, the liquid resin such as liquid non-conductive adhesive is led into the groove 31 from the end 31*a* after completed the assembly of the head suspension 1. The led adhesive spreads into the groove 31 and flows out of the groove 31 with capillary phenomenon between the rigid part 17 and the flexure 7, so that the adhesive fills the groove 31 and a gap defined between the rigid part 17 and the flexure 7 inside the surrounding area of the groove 31. This easily makes the resin seat 29 between the rigid part 17 and the flexure 7 by the solidified adhesive.

Further, leading the liquid resin into the groove 31 after completed the assembly of the head suspension 1 causes no poor welding due to the interposition of the liquid resin between portions to be welded.

The liquid adhesive led into the groove 31 from the end 31*a* securely reaches a deep portion that is not directly accessible such as a middle portion of the facing area between the rigid part 17 and the flexure 7.

The groove 31 controls a flow of the liquid resin and suppresses an unexpected flow to prevent variation and unbalance in rigidity of the head suspension 1 and stabilize vibration characteristics such as resonance characteristic of the head suspension 1.

The groove 31 is formed by partial etching without additional process when the load beam 5 is shaped by etching.

The head suspension 1 further includes the resin seats 33 interposed between the base plate 3 and the auxiliary plate 11 to prevent the base plate 3 and the auxiliary plate 11 from hitting each other due to vibration of at least one of the base plate 3 and the auxiliary plate 11.

The head suspension 1 provides the above-identified effects even between the base plate 3 and the auxiliary plate 11.

The base plate 3 is shaped by pressing or bending with molds, so that the groove 35 is formed by coining without additional process when the base plate 3 is shaped.

According to the embodiment, the resin seats 29 and 33 have damping characteristics.

Therefore, the resin seats 29 and 33 accurately prevent hitting between the rigid part 17 and the flexure 7 and between the base plate 3 and the auxiliary plate 11 due to the vibration and improve the vibration characteristics of the head suspension 1.

The resin seats 29 and 33 are made of the resin adhesive.

The resin seats 29 and 33 serve as additional fixations to secure the rigid part 7 and the base plate 3 to the flexure 7 and the auxiliary plate 11 together with the welding spots 12, 21 and 24. This accurately prevents hitting between the rigid part 17 and the flexure 7 and between the base plate 3 and the auxiliary plate 11 due to vibration.

The auxiliary plate 11 includes the support edge portions 11*a* that protrude into the openings 25 to support the piezoelectric elements 9, respectively. The auxiliary plate 11 also includes the recessed portions or grooves 37*a*, 37*b*, 37Aa and 37Ab having respective end 37*aa*, 37*ab*, 37Aaa and 37Aab disposed on the support edge portions 11*a*. The resin seats formed to the grooves 37*a*, 37*b*, 37Aa and 37Ab by leading the liquid adhesive into the grooves 37*a*, 37*b*, 37Aa and 37Ab from the ends 37*aa*, 37*ab*, 37Aaa and 37Aab and interposed between the base plate 3 and the auxiliary plate 11 to prevent hitting between the base plate 3 and the auxiliary plate 11 due to vibration of at least one of the base plate 3 and the auxiliary plate 11.

Therefore, the resin seats prevent the base plate 3 and the auxiliary plate 11 in the vicinity of the piezoelectric elements 9 from surface breaking to suppress defect due to particles dropping off. Namely, even in the vicinity of the piezoelectric element 9, the head suspension 1 provides the above-identified effects.

The grooves 37*a*, 37*b*, 37Aa and 37Ab are partly disposed on the support edge portions 11*a*, so that the ends 37*aa*, 37*ab*, 37Aaa and 37Aab lead the liquid adhesive as the liquid resin into the grooves 37*a*, 37*b*, 37Aa and 37Ab without additional process when the piezoelectric elements 9 are attached to the openings 25.

The liquid stoppers 43 and 43B are formed opposite to the support edge portions 11*a* with respect to the grooves 37*a* and 37*b*.

Therefore, even if the liquid adhesive 27 as resin flows out of the grooves 37*a* and 37*b*, the liquid stoppers 43 and 43B stop spreading the liquid adhesive 27 to prevent the adhesive 27 from affecting on the resilient part 19 of the load beam 5.

Figure 12:
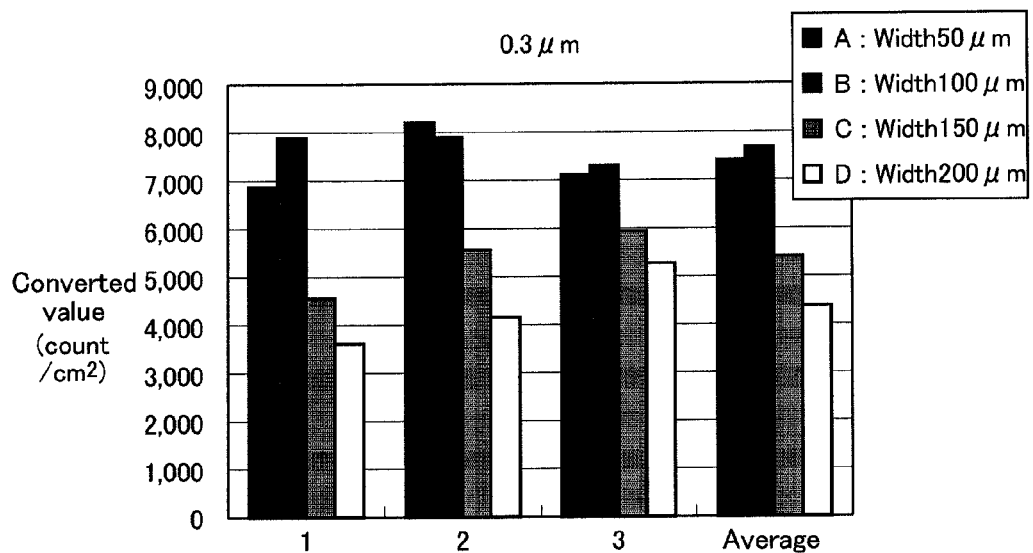
FIG. 12 is a graph illustrating measurement result of the number of particles whose respective diameters are 0.3 µm or more measured by a liquid particle counter according to the first embodiment.
Figure 13:
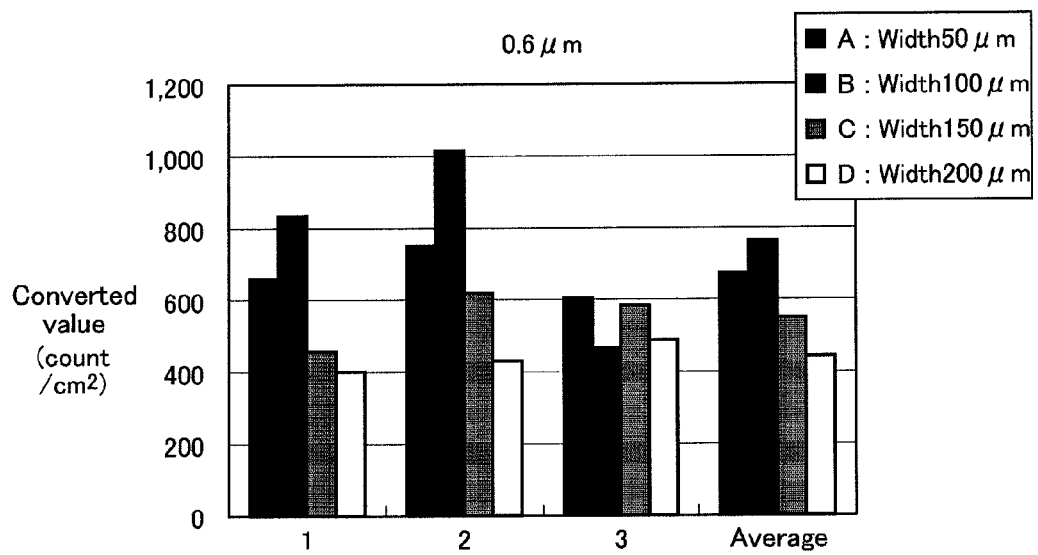
FIG. 13 is a graph illustrating measurement result of the number of particles whose respective diameters are 0.6 µm or more measured by a liquid particle counter according to the first embodiment.

FIGS. 12 and 13 are measurement results of a liquid particle counter in which FIG. 12 is a graph of the measured number of particles whose respective diameters are 0.3 µm or more and FIG. 13 is a graph of the measured number of particles whose respective diameters are 0.6 mm or more. The measured object is a head suspension having a structure that is the same as the head suspension 1 of FIG. 1. Namely, the objective head suspension has resin seats 29 and 33 formed to grooves 31 and 35 between the load beam 5 and the flexure 7 and between the base plate 3 and the auxiliary plate 11. The objective head suspension also has the resin seats 39 formed to the grooves 37*a* and 37*b* in the vicinity of the piezoelectric elements 9.

In FIGS. 12 and 13, an ordinate indicates the number of particles per unit area (cm2) and an abscissa indicates width of a groove of different objective head suspensions "1", "2" and "3". In FIGS. 12 and 13, a set of four bars of each objective head suspension indicate measurement results at the width of 50 μm, 100 μm, 150 μm and 200 μm from left. A rightmost set of bars is an average of the results of the objective head suspensions.

As illustrated in FIGS. 12 and 13, the grooves 31, 35, 37*a* and 37*b* decrease the number of particles with increasing the width as the general tendency. In addition, there is a limit to increase the width.

Figure 16:
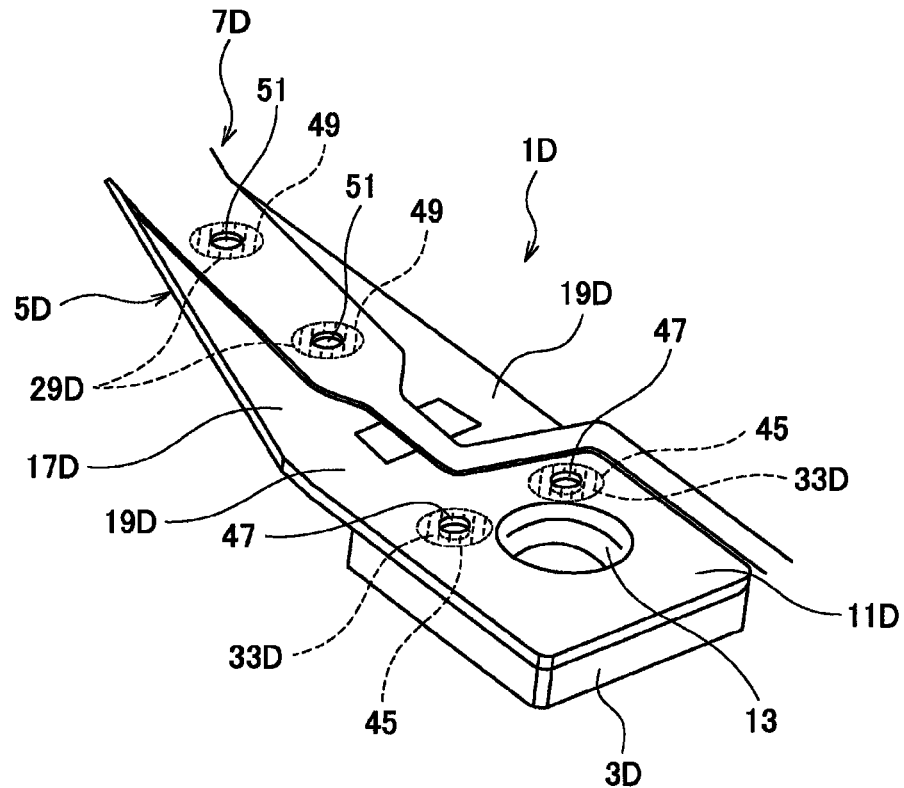
FIG. 16 is a schematic perspective view partly illustrating a modification of a head suspension according to the second embodiment.
Figure 17:
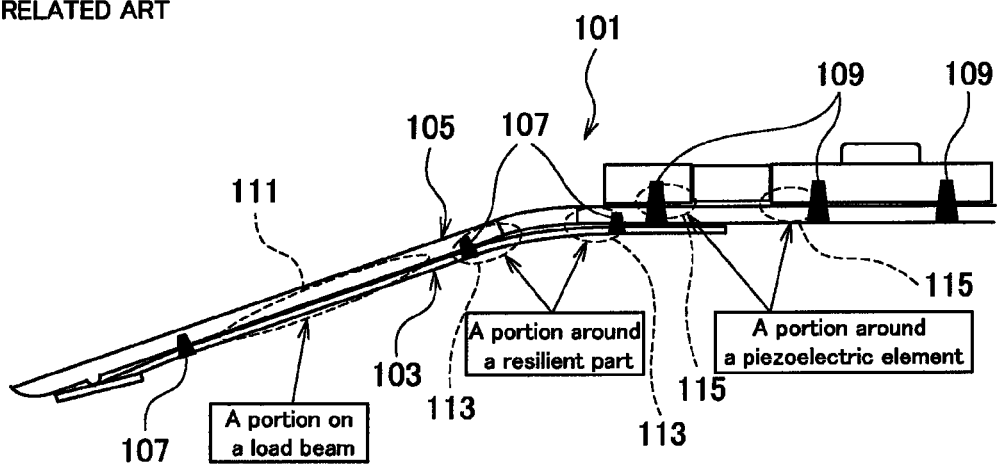
FIG. 17 is a schematic side view illustrating a head suspension according to a related art.

A second embodiment of the present invention with reference to FIGS. 14 to 16.

FIG. 14 is a schematic perspective view partly illustrating a head suspension, FIG. 15A is a sectional view illustrating a part XVA in FIG. 14, FIG. 15B is a sectional view illustrating a modification of a part XVA in FIG. 14 and FIG. 16 is a schematic perspective view partly illustrating an another modification. The second embodiment has the same parts as the first embodiment. Accordingly, the same parts are represented with the same reference marks or the same reference marks with "D" to omit a repetition of explanation.

As illustrated in FIGS. 14 and 15A, a head suspension 1D has a load beam 5D to which an auxiliary plate 11 is integrally connected and a base plate 3D on which the auxiliary plate 11D is fixed at a plurality of welded points or spots (not illustrated) similar to the head suspension 1 of the first embodiment.

A flexure 7D is fixed to the load beam 5D at a plurality of welded points (not illustrated).

Resin seats 33D and 29D are interposed between the base plate 3D and the auxiliary plate 11D and between a rigid part 17D of the load beam 5D and the flexure 7, respectively.

The auxiliary plate 11D has grooves 45 to which respective resin seats 33D are mainly formed. The auxiliary plate 11D has a through hole 47 with respect to each groove 45. The through hole 47 exposes the groove 45 on the outside of a facing area through which the base plate 3D and auxiliary plate 11D face each other. Namely, the through hole 47 serves as a communicating portion through which the groove 45 communicates with the outside of the facing area.

In the formation of each resin seat 33D, liquid non-conductive adhesive as liquid resin is led into the groove 45 from the through hole 47 after completed the assembly of the head suspension 1D. The led adhesive spreads into the groove 45 and through hole 47 with capillary phenomenon and flows out of the groove 45 and through hole 47 between the base plate 3D and the auxiliary plate 11D. Therefore, the adhesive fills the groove 45 and the through hole 47 and a gap defined between the base plate 3D and the auxiliary plate 11D within the surrounding area of the groove 45 and through hole 47. The adhesive is solidified to form the resin seat 33D between the base plate 3D and the auxiliary plate 11D.

The flexure 7D has grooves 49 and through hole 51 formed through the flexure 7D, and a resin seat 29D is formed to each groove 49 and through hole 51. The resin seat 29D spreads to the surround area of the groove 49 and the through hole 51.

In the formation of each resin seat 29D, liquid non-conductive resin adhesive as liquid resin is led into the groove 49 from the through hole 51 after completed the assembly of the head suspension 1D. The led adhesive spreads into the groove 49 and through hole 51 with capillary phenomenon and flows out of the groove 49 and through hole 51 between the rigid part 17D and the flexure 7D. Therefore, the adhesive fills the groove 49 and the through hole 51 and a gap defined between the rigid part 17D and the flexure 7D within the surrounding area of the groove 49 and through hole 51. The adhesive is solidified to form the resin seat 29D between the rigid part 17D and the flexure 7D.

According to the modification of FIG. 15B, the groove 45 is formed on the base plate 3D and the resin seat 33D is mainly formed to the groove 45 on the base plate 3D.

According to the modification of FIG. 16, the through holes 47 and 51 are formed through the auxiliary plate 11D and the flexure 7D, respectively. The grooves 45 and 49 have a ring or annular planar shape and are formed on the base plate 3D and the rigid part 17D of the load beam 5D, respectively.

In the formation of the resin seats 29D and 33D, liquid non-conductive resin adhesive as liquid resin is led into the grooves 45 and 49 from the through holes 47 and 51 after completed the assembly of the head suspension 1D. The led adhesive spreads into the grooves 45 and 49 with capillary phenomenon and the surrounding areas thereof. The adhesives in the grooves 45 and 49 are solidified to form the resin seat 29D between the rigid part 17D and the flexure 7D and the resin seat 33D between the base plate 3D and the auxiliary plate 11D.

Therefore, the second embodiment provides the same effects as the first embodiment due to the resin seats 29D and 33D.

Further, the combination of the grooves 45 and 49 and the through holes 47 and 49 reduce the amount of the liquid resin such as liquid resin adhesive, because each combination of a groove and through hole is positioned at a pinpoint in which vibration is maximized to fix the flexure or base plate to the load beam or auxiliary plate.

The present invention may form simple recessed portions instead of grooves.

The grooves 31, 35, 37*a*, 37*b*, 37Aa and 37Ab may have a curved planar shape, waved planar shape or the like. The liquid stopper may have a curved planar shape, waved planar shape or the like. The liquid stoppers 43 and 43D may have recessed portions that are aligned on a curved line, waved line or the like.

The present invention is applicable to other plates or plate-like members that involve a problem due to particles produced by surface breaking through vibration such as ultrasonic vibration.

What is claimed is:

1. A connecting structure comprising;
   a plate and an opposite member having a surface on which the plate material is fixed at a plurality of welded points; and
   a resin seat interposed between the plate material and the opposite member so that the resin seat prevents the plate material and the opposite member from hitting each other due to vibration of at least one of the plate material and the opposite member.

2. The connecting structure of claim 1, further comprising:
   a communicating portion through which the groove communicates with the outside of the facing area between the plate material and the opposite member so that liquid resin is led into the groove through the communicating portion to form the resin seat.

3. The connecting structure of claim 2, wherein the communicating portion is an end of the recessed portion or groove, and the recessed portion or groove is configured to extend beyond said length so that said end is outside the facing area.

4. A connecting structure comprising;
   a plate material and an opposite member having a surface on which the plate material is fixed at a plurality of welded points;
   a resin seat interposed between the plate material and the opposite member so that the resin seat prevents the plate material and the opposite member from hitting each other due to vibration of at least one of the plate material and the opposite member;
   a recessed portion or groove formed on at least one of the plate material and the opposite member within a facing area through which the plate material and the opposite member face each other, wherein the resin seat is formed to the recessed portion or groove; and
   a communicating portion through which the groove communicates with the outside of the facing area between the plate material and the opposite member so that liquid resin is led into the groove through the communicating portion to form the resin seat; and
   wherein the communicating portion is an end of the recessed portion or groove, the recessed portion or groove extends to have the end exposed on the outside of the facing area.

5. The connecting structure of claim 4, wherein the resin seat has damping characteristics.

6. The head suspension of claim 5, wherein the resin seat has damping characteristics.

7. A head suspension comprising the connecting structure of claim 4, wherein
   the opposite member is a base plate to be attached to a carriage that rotates the base plate around an axis;
   the head suspension further comprises a load beam including a rigid part and a resilient part to which the rigid part is connected to be disposed on a front end distal to the base plate;
   the plate material is an auxiliary plate integrally connected to the resilient part to be disposed on a base end proximal to the base plate, the auxiliary plate fixed to the base plate at a plurality of welded points; and
   the ahead suspension further comprises a flexure including a read/write head and a wiring and attached to the load beam.

8. A head suspension comprising the connecting structure for a plate material of claim 4, wherein the opposite member is a base plate.

9. A head suspension with a connecting structure, comprising;
   a base plate to be attached to a carriage that rotates the base plate around an axis;
   a load beam including a rigid part and a resilient part, a base end of the load beam fixed to the base plate at a plurality of first welded points;
   a flexure including a read/write head and a wiring and fixed to the load beam at a plurality of second welded points; and
   a resin seat interposed between the load beam and the flexure so that the resin seat prevents the load beam and the flexure from hitting each other due to vibration of at least one of the load beam and the flexure.

10. The head suspension of claim 9, further comprising:
    a communicating portion through which the groove communicates with the outside of the facing area between the load beam and the flexure so that liquid resin is led into the groove through the communicating portion to form the resin seat.

11. The head suspension of claim 10, wherein the communicating portion is an end of the recessed portion or groove, and the recessed portion or groove is configured to extend beyond said length so that said end is outside the facing area.

12. A head suspension with a connecting structure, comprising;
    a base plate to be attached to a carriage that rotates the base plate around an axis;
    a load beam including a rigid part and a resilient part, a base end of the load beam fixed to the base plate at a plurality of first welded points;
    a flexure including a read/write head and a wiring and fixed to the load beam at a plurality of second welded points;
    a resin seat interposed between the load beam and the flexure so that the resin seat prevents the load beam and the flexure from hitting each other due to vibration of at least one of the load beam and the flexure;
    a recessed portion or groove formed on at least one of the load beam and the flexure within a facing area through which the load beam and the flexure face each other, wherein the resin seat is formed to the recessed portion or groove; and
    a communicating portion through which the groove communicates with the outside of the facing area between the load beam and the flexure so that liquid resin is led into the groove through the communicating portion to form the resin seat; and
    wherein the communicating portion is an end of the recessed portion or groove, the recessed portion or groove extends to have the end exposed on the outside of the facing area.

13. The connecting structure of claim 12, wherein the resin seat is made of adhesive.

14. The head suspension of claim 12, wherein the resin seat is made of adhesive.

15. The head suspension of claim 12, further comprising:
    an auxiliary plate connected to the resilient part to be disposed on a base end proximal to the base plate, the auxiliary plate fixed to the base plate at a plurality of welded points.

16. The head suspension of claim 15, further comprising:
    an opening formed through the base plate and the auxiliary plate; and
    a piezoelectric element attached to the opening through a solidified adhesive to be applied as a liquid adhesive and deformable in response to voltage applied thereto, the piezoelectric element moving the head through the load beam relative to the base plate according to deformation thereof.

* * * * *

UNITED STATES PATENT AND TRADEMARK OFFICE
CERTIFICATE OF CORRECTION

PATENT NO. : 8,842,393 B2
APPLICATION NO. : 13/530385
DATED : September 23, 2014
INVENTOR(S) : Ryuichi Kawatake et al.

It is certified that error appears in the above-identified patent and that said Letters Patent is hereby corrected as shown below:

In the Claims

At col. 12 lines 56-61 (claim 1), delete "a resin seat interposed between the plate material and the opposite member so that the resin seat prevents the plate material and the opposite member from hitting each other due to vibration of at least one of the plate material and the opposite member." and insert
-- a recessed portion or groove formed in a first portion of at least one of the plate material and the opposite member within a facing area through which the plate material and the opposite member face each other, said recessed portion or groove occupying less than all of the facing area;
resin received into and filling the groove along a length of the groove in the facing area leaving a portion of the facing area beyond said first portion without resin, said filled length of resin forming a resin seat formed to the recessed portion or groove and interposed between the plate material and the opposite member so that the resin seat prevents the plate material and the opposite member from hitting each other due to vibration of at least one of the plate material and the opposite member. --.

At col. 13, lines 32-33, delete "6. The head suspension of claim 5, wherein the resin seat has damping characteristics." and insert
-- 6. The connecting structure of claim 4, wherein the resin seat is made of adhesive. --;

At col. 13, line 50, delete "base plate." and insert
-- base plate;
the head suspension further comprises a load beam including a rigid part and a resilient part to which a rigid part is connected to be disposed on a front end distal to the base plate;
the plate material is an auxiliary plate connected to the resilient part to be disposed on a base end proximal to the base plate, the auxiliary plate fixed to the base plate at a plurality of welded points;
the head suspension further comprises a flexure including a read/write head and a wiring and fixed to the load beam;

Signed and Sealed this
Third Day of March, 2015

Michelle K. Lee
*Deputy Director of the United States Patent and Trademark Office*

CERTIFICATE OF CORRECTION (continued)
U.S. Pat. No. 8,842,393 B2 an opening is formed through the base plate and the auxiliary plate;

a piezoelectric element is attached to the opening through a solidified adhesive to be applied as a liquid adhesive and deformable in response to voltage applied thereto, the piezoelectric element that moves the head through the load beam relative to the base plate according to deformation thereof;

the support edge portion is formed on the auxiliary plate to protrude into the opening and support the piezoelectric element; and the recessed portion or groove is formed on the auxiliary plate and has an end disposed on the support edge portion. --; and At col. 13, last line delete "and".

At col. 14, lines 1-4, delete "a resin seat interposed between the load beam and the flexure so that the resin seat prevents the load beam and the flexure from hitting each other due to vibration of at least one of the load beam and the flexure." and insert -- a recessed portion or groove formed in a first portion of at least one of the load beam and the flexure within a facing area through which the load beam and the flexure face each other, said recessed portion or groove occupying less than all of the facing area; and resin received into and filling the groove along a length of the groove in the facing area leaving a portion of the facing area beyond said first portion without resin, said filled length of resin forming a resin seat formed to the recessed portion or groove and interposed between the load beam and the flexure so that the resin seat prevents the load beam and the flexure from hitting each other due to vibration of at least one of the load beam and the flexure. --; and At col. 14, lines 42-43, delete "13. The connecting structure of claim 12, wherein the resin is made of adhesive." and insert -- 13. The head suspension of claim 12, wherein the resin seat has damping characteristics. --.